(12) United States Patent
Levy et al.

(10) Patent No.: US 12,202,517 B2
(45) Date of Patent: Jan. 21, 2025

(54) SYSTEM AND METHOD FOR CONNECTED VEHICLE RISK DETECTION

(71) Applicant: Upstream Security, Ltd., Herzliya (IL)

(72) Inventors: Yoav Levy, Kfar-Vitkin (IL); Yonatan Appel, Ramat Hasharon (IL); Dor Attias, Beer Sheva (IL); Dan Sahar, Belmont, CA (US)

(73) Assignee: Upstream Security, Ltd., Herzliya (IL)

( * ) Notice: Subject to any disclaimer, the term of this patent is extended or adjusted under 35 U.S.C. 154(b) by 591 days.

(21) Appl. No.: 17/060,910

(22) Filed: Oct. 1, 2020

(65) Prior Publication Data

US 2021/0101618 A1 Apr. 8, 2021

Related U.S. Application Data

(60) Provisional application No. 62/909,364, filed on Oct. 2, 2019.

(51) Int. Cl.
*B60W 60/00* (2020.01)
*G06N 20/00* (2019.01)
*B60W 50/00* (2006.01)

(52) U.S. Cl.
CPC ......... *B60W 60/0015* (2020.02); *G06N 20/00* (2019.01); *B60W 2050/0075* (2013.01); *B60W 2554/4046* (2020.02); *B60W 2556/45* (2020.02)

(58) Field of Classification Search
CPC ......... B60W 60/0015; B60W 2556/45; B60W 2554/4046; B60W 2050/0075; G06N 20/00
See application file for complete search history.

(56) References Cited

U.S. PATENT DOCUMENTS

| | | | |
|---|---|---|---|
| 10,243,787 B2 | 3/2019 | Coote | |
| 10,262,226 B1* | 4/2019 | Flowers | G06V 10/764 |
| 10,817,604 B1* | 10/2020 | Kimball | G06F 8/73 |
| 10,902,336 B2* | 1/2021 | Lassoued | G06N 5/048 |
| 2012/0066007 A1 | 3/2012 | Ferrick et al. | |
| 2015/0373043 A1* | 12/2015 | Wang | G06F 21/6254 706/12 |
| 2016/0019807 A1* | 1/2016 | Uchida | G09B 9/042 434/66 |
| 2017/0032673 A1* | 2/2017 | Scofield | G06Q 40/08 |
| 2017/0124660 A1* | 5/2017 | Srivastava | G06Q 40/08 |
| 2017/0365169 A1* | 12/2017 | Tennent | G06Q 10/06 |

(Continued)

FOREIGN PATENT DOCUMENTS

| | | | | |
|---|---|---|---|---|
| CN | 110562261 A | * | 12/2019 | ............ B60W 40/08 |
| CN | 110588658 A | * | 12/2019 | |

(Continued)

*Primary Examiner* — Shelley Chen
(74) *Attorney, Agent, or Firm* — M&B IP Analysts, LLC

(57) ABSTRACT

A system and method for connected vehicle risk detection are presented. The includes computing risk scores for a plurality of behaviors detected with respect to a connected vehicle, wherein each of the detected plurality of behaviors is associated with the connected vehicle based on a contextual vehicle state of the connected vehicle; aggregating the computed risk scores to determine an aggregated risk score; determining a risk level for the connected vehicle based on the aggregated risk score; and causing execution of at least one mitigation action based on the determined risk level.

19 Claims, 5 Drawing Sheets

(56) References Cited

U.S. PATENT DOCUMENTS

| | | | |
|---|---|---|---|
| 2019/0102689 A1* | 4/2019 | Lassoued | G07C 5/085 |
| 2019/0130664 A1* | 5/2019 | Appel | G06N 20/00 |
| 2021/0304314 A1* | 9/2021 | Bradley | G06Q 40/08 |
| 2023/0260334 A1* | 8/2023 | Di Francesco | G07C 5/0866 |
| | | | 701/1 |

FOREIGN PATENT DOCUMENTS

| | | | | |
|---|---|---|---|---|
| CN | 110807196 A | | 2/2020 | |
| CN | 111178735 A | | 5/2020 | |
| CN | 110705628 A | * | 10/2020 | ........... G06K 9/6223 |
| JP | 2009109749 A | * | 5/2009 | |
| JP | 2009169716 A | * | 7/2009 | |
| JP | 4664826 B2 | * | 4/2011 | ........... G07C 5/0858 |

* cited by examiner

SYSTEM AND METHOD FOR CONNECTED VEHICLE RISK DETECTION

CROSS-REFERENCE TO RELATED APPLICATIONS

This application claims the benefit of U.S. Provisional Application No. 62/909,364 filed on Oct. 2, 2019, the contents of which are hereby incorporated by reference.

TECHNICAL FIELD

The present disclosure relates generally to cybersecurity in connected and autonomous vehicles, and more specifically to cybersecurity risk detection in connected and autonomous vehicles.

BACKGROUND

With advances in computer technology, computerized navigation and control systems in vehicles have been created to improve drivers' experiences and to allow for remotely controlled transportation of people and goods. To this end, computerized control and management services may collect data remotely from systems deployed in vehicles. For example, a navigation system installed in a vehicle may collect and upload (e.g., via a cellular network) telemetry data such as mechanical data related to components of the vehicle, location data, functional data related to vehicle activities (e.g., movements, use of horn, etc.), and the like. Prior to introduction of such computerized control and management systems, collection of such data was not possible.

While computerized control and management systems can be incredibly useful for vehicle operators, these systems leave vehicles exposed to new dangers. Specifically, malicious entities can control vehicle functions and, therefore, may misappropriate the vehicle for their own purposes. This opens the door to vehicle failure, theft, and other malicious activity, which can lead to death, injury, and financial damage.

To avoid these dangers, some third-party threat detection tools have been developed. These third-party threat detectors collect data from a connected vehicle and detect potentially malicious activity for each vehicle based on its respective data. For example, such malicious activity may include data, communication, and behavior anomalies, risks, and incidents. Each connected vehicle includes computing components and communicates with one or more external entities to send collected data, receive alerts, and the like. As connected vehicles become more prominent, more advanced connected vehicle cybersecurity solutions become increasingly desirable.

Some existing threat detectors are limited in that they are typically only exposed to partial vehicle data and, even when exposed to a large amount of data for a particular vehicle, only detect threats based on data for that single vehicle. Additionally, such existing solutions are limited in their ability to process large quantities of data from different sources. As a result, such existing threat detectors may fail to detect some threats, mis-prioritize threats, fail to accurately determine root causes of threats, or inefficiently process threats.

Some existing threat detectors are limited in that they perform threat detection using batch analysis. These solutions often fail to detect and respond to threats in a sufficiently fast manner. Also, these solutions do not offer vehicle-specific detections and algorithms, thereby reducing the precision of any detected threats. In other words, such solutions may identify, for example, a group or subgroup of vehicles in which the threat occurred, but have difficulty accurately identifying which specific vehicle(s) caused a threat to be detected.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for connected vehicle risk detection. The method comprises computing risk scores for a plurality of behaviors detected with respect to a connected vehicle, wherein each of the detected plurality of behaviors is associated with the connected vehicle based on a contextual vehicle state of the connected vehicle; aggregating the computed risk scores to determine an aggregated risk score; determining a risk level for the connected vehicle based on the aggregated risk score; and causing execution of at least one mitigation action based on the determined risk level.

Certain embodiments disclosed herein include a system for method for connected vehicle risk detection. The system includes a processing circuitry; and a memory, the memory containing instructions that, when executed by the processing circuitry, configure the system to: compute risk scores for a plurality of behaviors detected with respect to a connected vehicle, wherein each of the detected plurality of behaviors is associated with the connected vehicle based on a contextual vehicle state of the connected vehicle; aggregate the computed risk scores to determine an aggregated risk score; determine a risk level for the connected vehicle based on the aggregated risk score; and cause execution of at least one mitigation action based on the determined risk level.

BRIEF DESCRIPTION OF THE DRAWINGS

The subject matter disclosed herein is particularly pointed out and distinctly claimed in the claims at the conclusion of the specification. The subject matter disclosed herein and other objects, features, and advantages of the disclosed embodiments will be apparent from the following detailed description taken in conjunction with the accompanying drawings.

DETAILED DESCRIPTION

Figure 1:
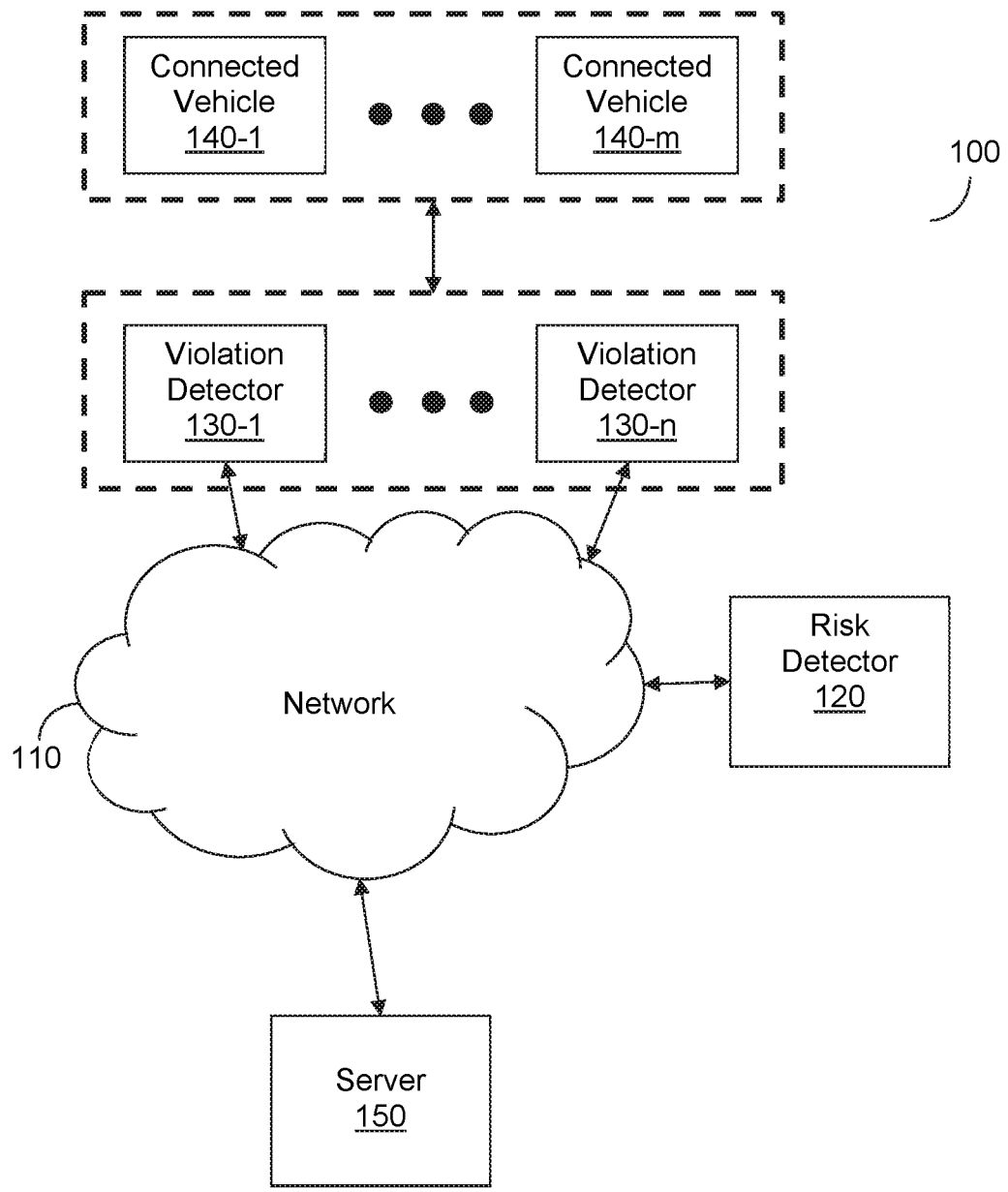
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The above-noted limitations in existing threat detectors create a need for accurately and efficiently identifying potential risks in connected vehicles. Specifically, these existing solutions fail to account for accumulation of unusual or otherwise risky behaviors. For example, existing solutions may determine whether a behavior presents a risk in isolation but fail to identify a threat that manifests as multiple unusual behaviors that individually pass inspection.

To this end, the disclosed embodiments provide techniques for aggregating potentially risky events in order to accurately gauge risks for connected vehicles. These techniques further improve accuracy of the aggregation using machine learning. The disclosed embodiments also provide techniques for improving risk detection in connected vehicles by projecting risks among vehicles.

As noted above, many behaviors may be indicative of threats to connected vehicle cybersecurity without triggering existing threat detection solutions. It has been identified that, by identifying a pattern of related behaviors and aggregating their respective risk scores, accuracy of risk detection may be improved. Further, risk scores may be increased or decreased when certain combinations of behaviors are present in order to improve their accuracy. These risky combinations of behaviors may be learned using machine learning. To this end, the disclosed embodiments provide techniques for further improving accumulation of risky events via inter-behavior risk factor tuning.

Additionally, it has been identified that unknown or otherwise unusual behaviors are more likely to be manifestations of risks such that risk scores for unknown behaviors may be increased to more accurately gauge risk. Similarly, risk scores for known or common behaviors may be decreased. It has been identified degree to which behaviors are known or common may be learned using machine learning. Thus, the disclosed embodiments further include techniques for modifying risk scores of behaviors based on how well-known they are using machine learning.

The various disclosed embodiments include a method and system for risk detection in connected vehicles. Multiple behaviors of a connected vehicle are detected. A risk score is calculated for each detected behavior. A risk level is determined for the connected vehicle based on the risk scores. Inter-behavior effects on the risk level are determined by applying inter-behavior risk factors. The inter-behavior risk factors are tuned via machine learning. One or more mitigation actions are taken based on the determined risk level.

In some embodiments, the behaviors may include projected behaviors based on behaviors of other connected vehicles. To this end, risk scores are projected for the projected behaviors based on risk scores for behaviors of the other connected vehicles.

FIG. 1 shows an example network diagram 100 utilized to describe various disclosed embodiments. In the example network diagram 100, a risk detector 120 is configured to communicate with a plurality of connected vehicle violation detectors (also referred to as detectors) 130-1 through 130-n (hereinafter referred to as a violation detector 130 or as violation detectors 130 for simplicity) and a server 150 over a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The violation detectors 130 may be, but are not limited to, threat detectors installed in or communicating with connected vehicles 140-1 through 140-m (hereinafter referred to as a connected vehicle 140 or as connected vehicles 140 for simplicity). Such violation detectors 130 may include, but are not limited to, in-vehicle cybersecurity tools (e.g., in-vehicle threat detectors), network or application security threat detectors, offline analytics threat detectors, risk analysis tools, data analysis tools, security information and events management (SIEM) systems, device security systems, application security systems, user or entity behavioral analytics systems, security operations, analysis and reporting (SOAR) systems, combinations thereof, and the like.

In an example implementation, the violation detectors 130 include a contextual vehicle state monitor configured to detect violations based on contextual vehicle state. The contextual vehicle state may be a snapshot of multiple vehicle state properties at a given time. An example contextual vehicle state monitor and detection of violations based on contextual vehicle state are described further in U.S. patent application Ser. No. 16/451,569, assigned to the common assignee, the contents of which are hereby incorporated by reference.

The violation detectors 130 are configured to identify connected vehicle mobility violations based on data collected by the connected vehicles 140. The mobility violations may be used to generate events or messages indicating the violations. In an example implementation, at least some of the detectors 130 are third-party threat detectors provided by entities other than the entity operating the risk detector 120. The violations may include, but are not limited to, breaches or other violations of policies.

A connected vehicle 140 is configured to receive and send data, and may be further configured to implement commands in the received data (for example, a "Start_Engine" command). To this end, a connected vehicle 140 includes computer components (not shown) such as, but not limited to, a processing circuitry, a memory, a network interface, and the like. A connected vehicle may be, but is not limited to, a car, a bus, a truck, a ship, a plane, a robot, and the like. It should be noted that the connected vehicles 140 may include, but are not limited to, autonomous vehicles, semi-autonomous vehicles, non-autonomous vehicles, or any combinations thereof. The connected vehicles may be at least partially controlled remotely. Data collected by the connected vehicles 140 may include, but is not limited to, telematics, vehicle sensor data, over-the-air (OTA) update data, log analytics, Lidar data, radar data, images, videos, and the like.

In an embodiment, the mobility violations include deviations from normal connected vehicle behavior for a vehicle, a group of vehicles, a type of vehicle, or a combination thereof. In a further embodiment, the mobility violations may be detected as described further in U.S. patent application Ser. No. 16/047,444, assigned to the common assignee, the contents of which are hereby incorporated by reference.

The server 150 may be a command and control server, a telematics server, or another system configured to communicate with connected vehicles (e.g., one or more of the connected vehicles 140), entities related to connected vehicles (e.g., a mobile application used to control a connected vehicle), both, and the like. In an example implementation, the server 150 is configured to at least partially control the connected vehicle(s) it communicates with and, therefore, may be utilized for performing or aiding in performing mitigation actions.

In some implementations, the violation detectors 130 are configured to send violations to the server 150. To this end, in an embodiment, the risk detector 120 is configured to intercept violations in-flight between the detectors 130 and the server 150. In another embodiment, the violations may be collected from the server 150.

The risk detector 120 is configured to detect risks based on data from the violation detectors 130 in accordance with the disclosed embodiments.

It should be noted that a risk detector is shown in FIG. 1 merely for simplicity, and that additional servers may be utilized without departing from the scope of the disclosure. It should be noted that the risk detector 120 can be deployed in a cloud computing platform, a data center, or on-premises. The cloud computing platform may include a public cloud, a private cloud, a hybrid cloud, or combination thereof.

Figure 2:
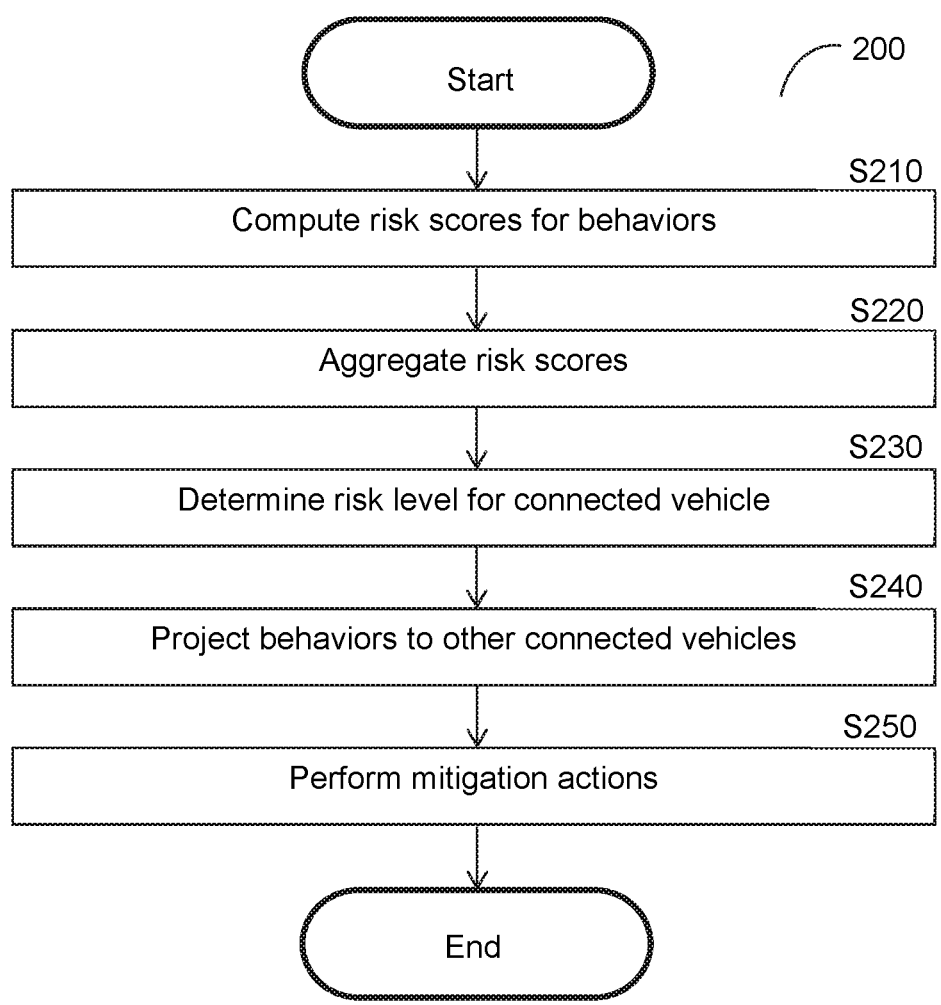
FIG. 2 is a flowchart illustrating a method for detecting risks in connected vehicles according to an embodiment.

FIG. 2 shows an example flowchart 200 illustrating a method for detecting risks in connected vehicles according to an embodiment.

At S210, risk scores are computed for behaviors detected with respect to a connected vehicle. In an embodiment, S210 includes associating each detected behavior with a respective connected vehicle based on connected vehicle context.

Figure 3:
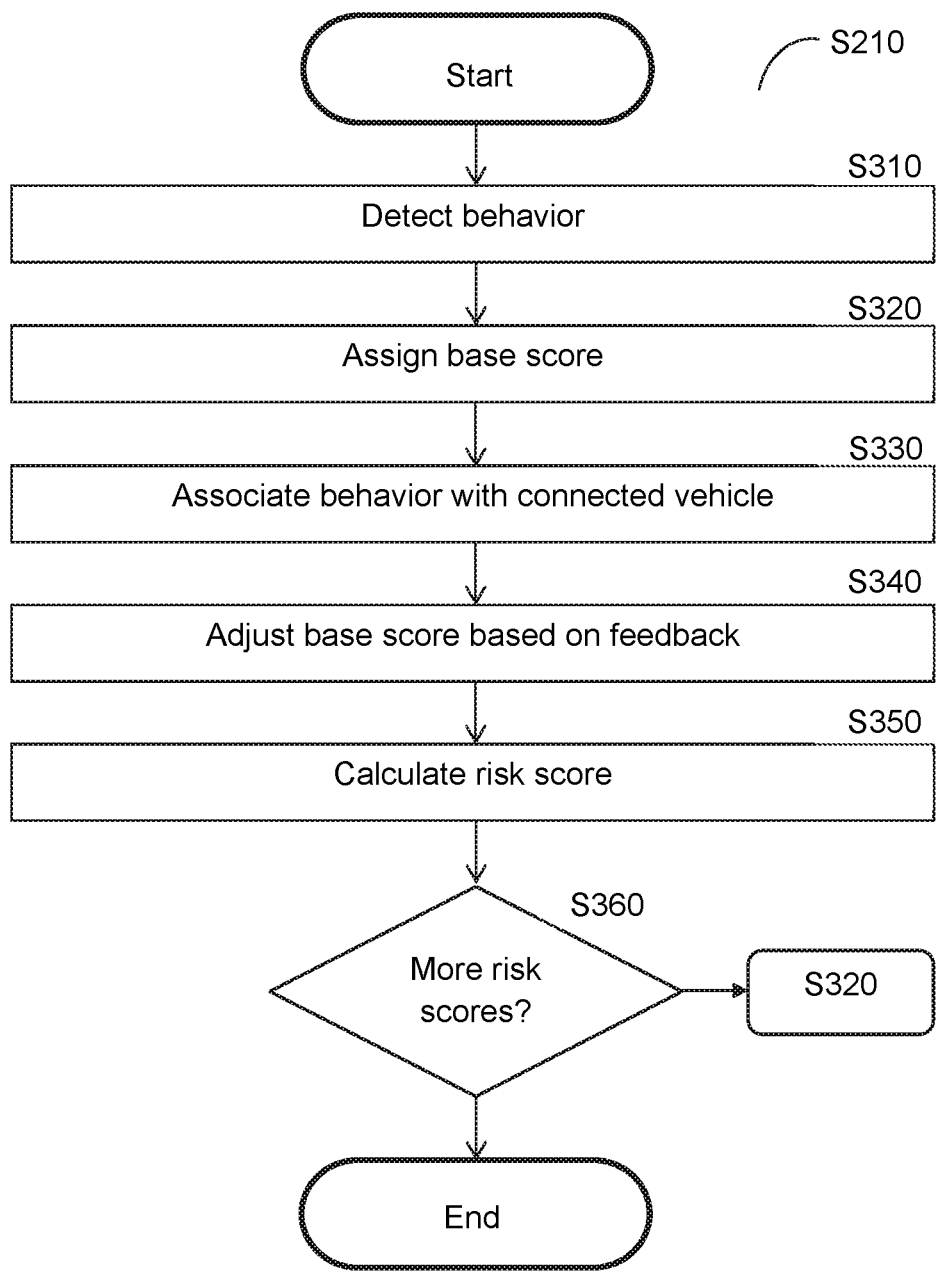
FIG. 3 is a flowchart illustrating a method for calculating a risk score for a connected vehicle behavior according to an embodiment.

An example illustrating how risk scores are computed is now described with respect to FIG. 3. FIG. 3 shows an example flowchart S210 illustrating a method for computing a risk score for a behavior according to an embodiment.

At S310, a potentially risky behavior of a connected vehicle is detected. The potentially risky behavior may be a type of potentially risky behavior such as, but not limited to, a violation of a connected vehicle security policy, an anomalous activity, a benign activity occurring while there is an aggravating circumstance, a known risky behavior, and a projected behavior determined based on a risk level for another connected vehicle. Projected behaviors are described further herein below with respect to S240.

In an example implementation, the potentially risky behaviors may be detected as described further in U.S. patent application Ser. No. 16/890,671, the contents of which are hereby incorporated by reference.

At S320, a base score is assigned to the potentially risky behavior. The base score may be a predetermined score and may differ depending on, for example, a type of the behavior. When the behavior is a projected behavior, the base score may be the risk score previously determined for the projected behavior.

At S330, the potentially risky behavior is associated with a connected vehicle. The association may be determined directly or indirectly based on at least one identifier, such as server activity, vehicle identifiers, user activity (e.g., a user remotely controlling a connected vehicle), or driver activity reflected in the contextual vehicle state.

In an embodiment, the association between the detected behavior and a connected vehicle is determined based on a contextual vehicle state. The contextual vehicle state is a snapshot of vehicle state properties for a given time that is determined based on data ingested from multiple sources.

The contextual vehicle state may be determined based on enriched messages, where each of the enriched messages is generated based on missing property values and predictive properties in messages generated by vehicle monitoring systems. The enrichment provides inferences about missing properties in each message based on values of existing properties in the message or in other messages. Example techniques for determining contextual vehicle states are described in U.S. patent application Ser. No. 16/451,569, assigned to the common assignee, the contents of which are hereby incorporated by reference.

At optional S340, the base score may be adjusted based on user feedback. As a non-limiting example, the base score may be displayed to a user, and the user may, via an interface, reduce the base score when the user knows that the behavior is not actually risky despite being determined as anomalous.

At S350, the risk score for the potentially risky behavior is determined. In an embodiment, S350 includes modifying the base score or the altered base score based on a likelihood that the detection of the potentially risky behavior is a false positive, i.e., that the potentially risky behavior is not actually risky even if the base score represents that the behavior is risky.

In an embodiment, the false positive risk factor may be determined based on the relative uniqueness of the behavior using a machine learning model. The relative uniqueness may include relative uniqueness of multiple or aggregated-set of behaviors.

The machine learning model is trained based on properties of previously detected behaviors during normal vehicle operations. To this end, the machine learning model may be trained to classify a behavior into a type associated with previously detected behaviors, and the uniqueness may be based on a number of the previously detected behaviors of the same type. As a non-limiting example, a likelihood of false positive risk factor for a behavior that has not been previously observed may be 1 (i.e., not reducing the risk score), while a likelihood of false positive risk factor for a behavior that has been previously observed on thousands of vehicles during normal operation may be 0.5 (i.e., reducing the risk score).

When a behavior is a projected behavior, the base score may also be modified by reducing the base score. In this regard, it is noted that risky behaviors occurring in a connected vehicle tend to increase the likelihood that the risky behavior will appear in any or all of similar connected vehicles, but is not guaranteed that such risky behavior will be duplicated. Thus, a risk score of a projected behavior may be reduced to ensure that a high-risk score for a projected behavior of a different connected vehicle does not overshadow other risk scores indicative of benign behaviors.

At S360, it is determined whether risk scores for additional detected behaviors should be determined and, if so, execution continues with S320; otherwise, execution terminates.

Returning to FIG. 2, at S220, the computed risk scores are aggregated to determine an aggregated risk score. The aggregation may include grouping similar behaviors and aggregating risk scores of grouped behaviors to determine an aggregated risk score for each group.

In an embodiment, the aggregation further includes applying inter-behavior risk factors to the risk scores. The risk factors are values representing weights to be given to different behaviors. The inter-behavior risk factors are determined based on relationships among behaviors. The behaviors used for determining inter-behavior risk factors include connected vehicle behaviors and may also include user behaviors, server behaviors, or other behaviors of entities communicating with or otherwise related to the connected vehicle.

In this regard, it has been identified that certain combinations of behaviors often correspond to threats to connected vehicle cybersecurity. As an example, sending of a malformed command sent to a server communicating with a connected vehicle may be followed up by a forbidden command from the server to the connected vehicle. The combination of the malformed and forbidden commands increases the likelihood that the connected vehicle is at risk due to a cybersecurity threat. Accordingly, altering risk scores based on interrelations among behaviors, and in particular behaviors of entities external to connected vehicles, allows for increasing the accuracy of risk level determination.

In an embodiment, S220 includes tuning the risk factors to be applied to the risk scores based on inter-behavior relationships. An example of aggregation including tuning risk factors is now described with respect to FIG. 4.

Figure 4:
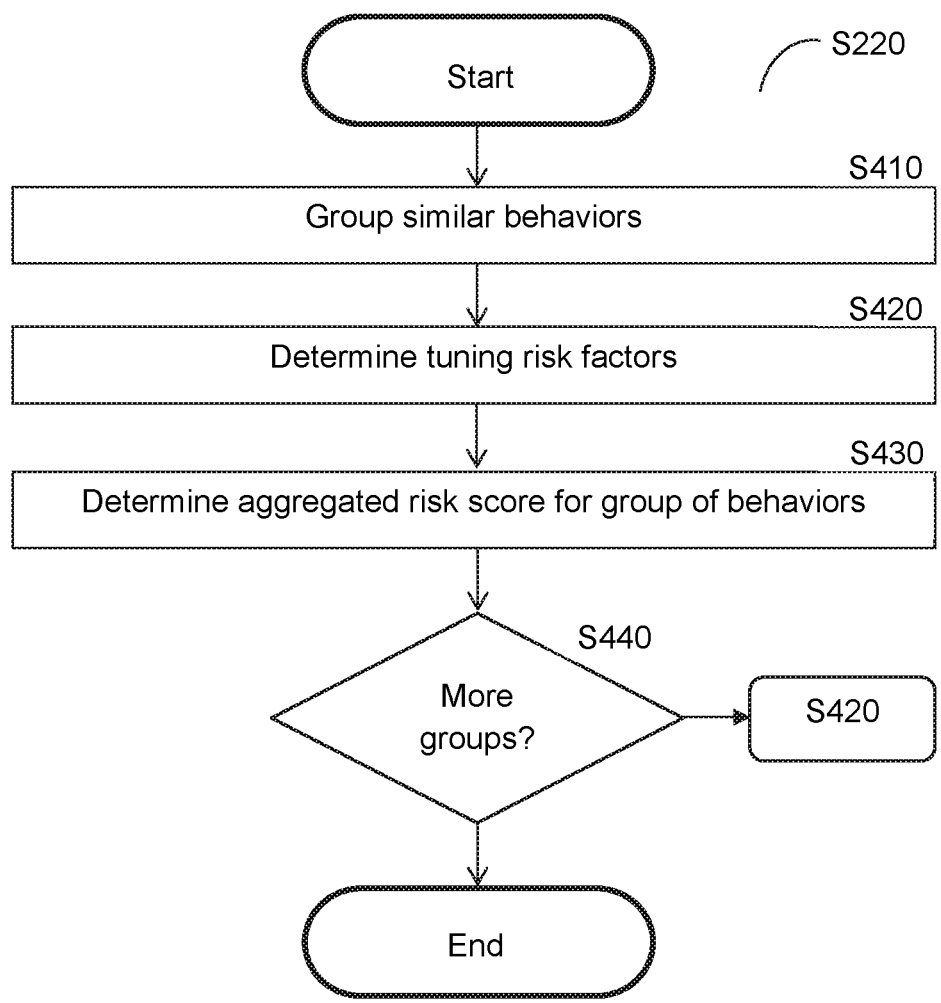
FIG. 4 is a flowchart illustrating a method for aggregating risk scores based on tuned risk factors according to an embodiment.

FIG. 4 shows an example flowchart S220 illustrating a method for aggregating risk scores based on tuned risk factors according to an embodiment.

At S410, similar behaviors are grouped. In an embodiment, S410 includes applying a similarity comparison function and grouping behaviors for which results of the similarity comparison function are above a threshold.

At S420, risk factors are determined for behaviors. The risk factors are utilized to tune the aggregation with respect to relationships among behaviors, thereby increasing the accuracy of risk level determination using the aggregated risk score. The relationships may be further defined with respect to specific scenarios involving behaviors occurring or appearing in particular orders. As a non-limiting example, a scenario may be connection of an onboard diagnostic system (OBD-II) followed by one or more security anomalies. As another example, another scenario may be a software update followed by an anomalous connected vehicle behavior.

In an embodiment, the risk factors to be applied are determined by applying a machine learning model to features related to the behaviors. The machine learning model is trained using a training set including training behavior features and training connected vehicle cybersecurity threats such that the machine learning model is trained to determine a degree of correlation between a combination of behaviors and a cybersecurity threat (or lack thereof).

At S430, an aggregated risk score is determined for a group of behaviors. In embodiment, S430 includes applying the determined risk factors to the respective risk scores for the behaviors and aggregating the results of the applications.

At S440, it is determined whether risk scores for additional groups are to be determined and, if so, execution continues with S420; otherwise, execution terminates.

Returning to FIG. 2, at S230, a risk level is determined for the connected vehicle based on the aggregated risk score. Risk levels may be defined with respect to, but not limited to, ranges of risk scores. As an example, groups of behaviors having risk scores above 1,000 may be determined as high risk and; otherwise, are determined as such that connected vehicles exhibiting one or more groups of behaviors having a risk score above 1,000 are determined as high risk. Alternatively, risk level may be relative to risk scores of other groups of behaviors. As a non-limiting example, connected vehicles exhibiting one or more groups of behaviors that are within the top 5% of risk scores may be determined as high risk.

At optional S240, behaviors may be projected for other connected vehicles based on the determined risk level. In an embodiment, risk scores are projected for similar connected vehicles with respect to the potentially risky behavior. In some implementations, only behaviors having risk scores above a threshold may be projected (i.e., behaviors identified as risky may be projected).

Two connected vehicles are similar with respect to potentially risky behavior when the potentially risky behavior affects both connected vehicles or is caused by an issue applicable to both connected vehicles. For example, connected vehicles belonging to the same fleet may be similar when the behavior relates to server activity of a server communicating with the fleet. The projected behavior and its determined risk score may be stored alongside other behavioral data for all connected vehicles determined to be similar. The projected behavior and its risk score may be used for risk detection in the similar connected vehicles.

Projecting behavior among similar connected vehicles allows for further increasing the accuracy of risk detection by including risk scores for the projected behaviors among the risk scores to be aggregated, thereby providing more information regarding the likelihood that a potentially risky behavior actually presents a threat. The threat may be, for example, a threat to an individual vehicle, a threat to a group of vehicles, a threat to a fleet of vehicles, and the like. More specifically, risky behavior will have higher risk scores such that, when projected, such risky behaviors will increase the aggregated risk score for similar connected vehicles. Likewise, benign behavior will have lower risk scores such that, when projected, such benign behaviors may decrease the aggregated risk scores for similar connected vehicles.

As a non-limiting example for projecting risky behavior, a security violation occurs due to a server sending a forbidden command to a connected vehicle. The connected vehicle is part of a fleet including other connected vehicles. The behavior related to receiving the forbidden command is projected to the other connected vehicles of the fleet with its corresponding risk score such that group risk scores for groups of behaviors of the other connected vehicles are increased.

As a non-limiting example for projecting benign behavior, an over the air (OTA) update applied on a set of vehicles causes one or more behaviors to occur. The behaviors caused by the OTA update and their corresponding risk scores are projected to other connected vehicles that have received or will soon receive the update.

At S250, one or more mitigation actions are performed based on the determined risk level. The mitigation actions may include, but are not limited to, generating alerts (e.g., when the risk level is above a threshold such that a risk has been detected), initiating one or more root cause analysis procedures, storing risk levels in association with their respective identified vehicles, flagging at-risk vehicles (e.g., connected vehicles having at least a threshold risk level), altering or initiating connected vehicle actions, altering or initiating activities by servers communicating with connecting vehicles, and the like.

Figure 5:
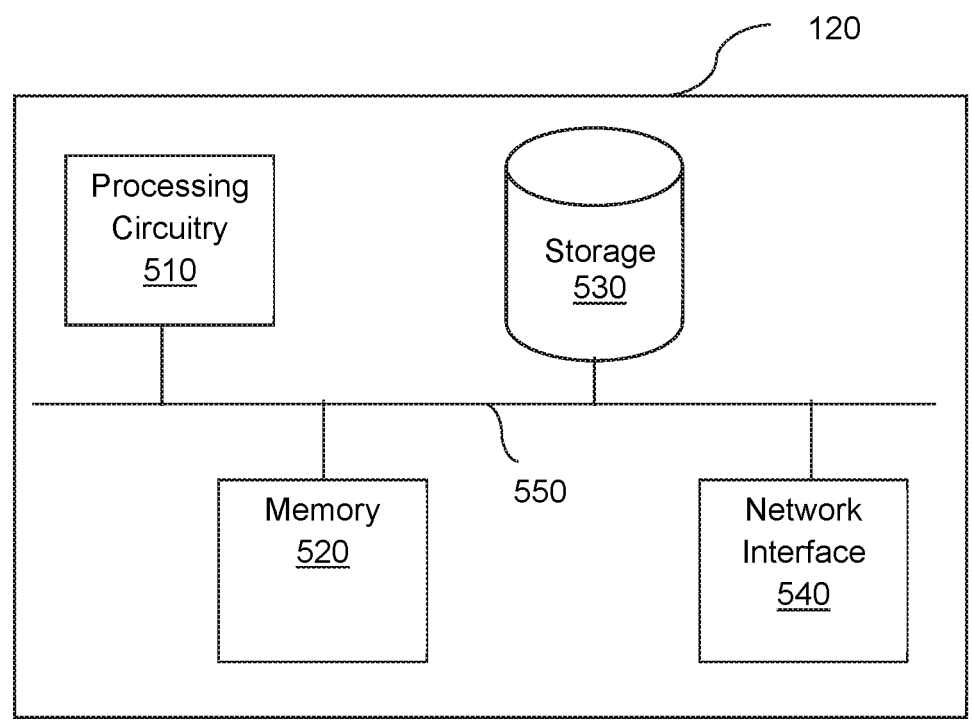
FIG. 5 is an example schematic diagram of a risk detector according to an embodiment.

FIG. 5 is an example schematic diagram of a risk detector 120 according to an embodiment. The risk detector 120 includes a processing circuitry 510 coupled to a memory 520, a storage 530, and a network interface 540. In an embodiment, the components of the risk detector 120 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., RAM, etc.), non-volatile (e.g., ROM, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, CD-ROM, Digital Versatile Disks (DVDs), or any other medium which can be used to store the desired information.

The network interface 540 allows the risk detector 120 to communicate for the purpose of, for example, receiving events, sending alerts or commands, and the like.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for connected vehicle risk detection, comprising:
computing risk scores for a plurality of behaviors related to cybersecurity that are detected with respect to a connected vehicle, wherein each of the detected plurality of cybersecurity-related behaviors is associated with the connected vehicle based on a contextual vehicle state of the connected vehicle, wherein the risk scores are computed based on interrelations among the plurality of detected cybersecurity-related behaviors;
aggregating the computed risk scores to determine an aggregated risk score;
determining a risk level for the connected vehicle based on the aggregated risk score; and
causing execution of at least one mitigation action based on the determined risk level.

2. The method of claim 1, wherein the connected vehicle is a first connected vehicle, wherein the plurality of cybersecurity-related behaviors further includes at least one projected cybersecurity-related behavior, wherein each of the at least one projected cybersecurity-related behavior is projected on the first connected vehicle based on risk scores for cybersecurity-related behaviors of at least one second connected vehicle.

3. The method of claim 1, further comprising:
detecting a potentially risky cybersecurity-related behavior of the connected vehicle, the potentially risky cybersecurity-related behavior having a type;
assigning a base score for the potentially risky cybersecurity-related behavior based on the type of the potentially risky cybersecurity-related behavior;

associating the potentially risky cybersecurity-related behavior with the connected vehicle based on at least one identifier and a contextual state of the connected vehicle;

adjusting the base score based on a likelihood that the potentially risky cybersecurity-related behavior is a false positive; and determining the risk score for the potentially risky cybersecurity-related behavior based on the adjusted base score.

4. The method of claim 3, wherein the potentially risky cybersecurity-related behavior includes any one of: a violation of a connected vehicle security policy, an anomalous activity, a benign activity occurring based on an aggravating circumstance, a known risky cybersecurity-related behavior, and a projected cybersecurity-related behavior determined based on a risk level for another connected vehicle.

5. The method of claim 1, wherein the contextual vehicle state of the connected vehicle is determined based on at least one enriched message generated based on at least one message generated by a vehicle monitoring system of the connected vehicle.

6. The method of claim 5, further comprising:
generating the at least one enriched message based on missing property values and predictive properties in the at least one message generated by a vehicle monitoring system of the connected vehicle.

7. The method of claim 1, wherein determining the risk score for each of the detected plurality of cybersecurity-related behaviors further comprises:
determining, using a machine learning model, a false positive risk factor based on a relative uniqueness of the cybersecurity-related behavior, wherein the machine learning model is trained based on training data including properties of previously detected cybersecurity-related behaviors during normal vehicle operations.

8. The method of claim 1, wherein aggregating the computed risk scores further comprises:
grouping similar cybersecurity-related behaviors of the detected plurality of cybersecurity-related behaviors based on a comparison function; and
determining at least one tuned risk factor for each of the detected plurality of cybersecurity-related behaviors based on the grouping of similar cybersecurity-related behaviors, wherein the aggregated risk scores are determined based further on the at least one tuned risk factor for each of the detected plurality of cybersecurity-related behaviors.

9. The method of claim 8, wherein the grouped similar cybersecurity-related behaviors represent interrelations among the detected plurality of cybersecurity-related behaviors such that the at least one tuned risk factor increases an accuracy of the determined risk level.

10. A non-transitory computer readable medium having stored thereon instructions for causing a processing circuitry to execute a process for connected vehicle risk detection, the process comprising:
computing risk scores for a plurality of behaviors related to cybersecurity that are detected with respect to a connected vehicle, wherein each of the detected plurality of cybersecurity-related behaviors is associated with the connected vehicle based on a contextual vehicle state of the connected vehicle, wherein the risk scores are computed based on interrelations among the plurality of detected cybersecurity-related behaviors;

aggregating the computed risk scores to determine an aggregated risk score;
determining a risk level for the connected vehicle based on the aggregated risk score; and
causing execution of at least one mitigation action based on the determined risk level.

11. A system for connected vehicle risk detection, comprising:
a processing circuitry; and
a memory, the memory containing instructions that, when executed by the processing circuitry, configure the system to:
compute risk scores for a plurality of behaviors related to cybersecurity that are detected with respect to a connected vehicle, wherein each of the detected plurality of cybersecurity-related behaviors is associated with the connected vehicle based on a contextual vehicle state of the connected vehicle, wherein the risk scores are computed based on interrelations among the plurality of detected cybersecurity-related behaviors;
aggregate the computed risk scores to determine an aggregated risk score;
determine a risk level for the connected vehicle based on the aggregated risk score; and
cause execution of at least one mitigation action based on the determined risk level.

12. The system of claim 11, wherein the connected vehicle is a first connected vehicle, wherein the plurality of cybersecurity-related behaviors further includes at least one projected cybersecurity-related behavior, wherein each of the at least one projected cybersecurity-related behavior is projected on the first connected vehicle based on risk scores for cybersecurity-related behaviors of at least one second connected vehicle.

13. The system of claim 11, wherein the system is further configured to:
detect a potentially risky cybersecurity-related behavior of the connected vehicle, the potentially risky cybersecurity-related behavior having a type;
assign a base score for the potentially risky cybersecurity-related behavior based on the type of the potentially risky cybersecurity-related behavior;
associate the potentially risky cybersecurity-related behavior with the connected vehicle based on at least one identifier and a contextual state of the connected vehicle;
adjust the base score based on a likelihood that the potentially risky cybersecurity-related behavior is a false positive; and
determine the risk score for the potentially risky cybersecurity-related behavior based on the adjusted base score.

14. The system of claim 13, wherein the potentially risky cybersecurity-related behavior includes any one of: a violation of a connected vehicle security policy, an anomalous activity, a benign activity occurring based on an aggravating circumstance, a known risky cybersecurity-related behavior, and a projected cybersecurity-related behavior determined based on a risk level for another connected vehicle.

15. The system of claim 11, wherein the contextual vehicle state of the connected vehicle is determined based on at least one enriched message generated based on at least one message generated by a vehicle monitoring system of the connected vehicle.

16. The system of claim 15, wherein the system is further configured to:

generate the at least one enriched message based on missing property values and predictive properties in the at least one message generated by a vehicle monitoring system of the connected vehicle.

17. The system of claim 11, wherein the system is further configured to:

determine, using a machine learning model, a false positive risk factor based on a relative uniqueness of the cybersecurity-related behavior, wherein the machine learning model is trained based on training data including properties of previously detected cybersecurity-related behaviors during normal vehicle operations.

18. The system of claim 11, wherein the system is further configured to:

group similar cybersecurity-related behaviors of the detected plurality of cybersecurity-related behaviors based on a comparison function; and determine at least one tuned risk factor for each of the detected plurality of cybersecurity-related behaviors based on the grouping of similar cybersecurity-related behaviors, wherein the aggregated risk scores are determined based further on the at least one tuned risk factor for each of the detected plurality of cybersecurity-related behaviors.

19. The system of claim 18, wherein the grouped similar cybersecurity-related behaviors represent interrelations among the detected plurality of cybersecurity-related behaviors such that the at least one tuned risk factor increases an accuracy of the determined risk level.

* * * * *